United States Patent [19]
Tanaka et al.

[11] Patent Number: 4,927,229
[45] Date of Patent: May 22, 1990

[54] OPTICAL CABLE COUPLING ADAPTER

[75] Inventors: Yoshiyasu Tanaka, Yokohama; Toshimi Nagaishi; Mituyoshi Suzuki, both of Machida, all of Japan

[73] Assignee: E. I. du Pont de Nemours and Company, Wilmington, Del.

[21] Appl. No.: 293,975

[22] Filed: Jan. 6, 1989

[51] Int. Cl.$^5$ .............................................. G02B 6/38
[52] U.S. Cl. ................................ 350/96.21; 350/96.20
[58] Field of Search ............... 350/96.20, 96.21, 96.22, 350/96.23

[56] References Cited

U.S. PATENT DOCUMENTS

| | | | |
|---|---|---|---|
| 4,056,305 | 11/1977 | McCartnet et al. | 350/96.21 X |
| 4,123,139 | 10/1978 | Sandahl | 350/96.21 |
| 4,132,461 | 1/1979 | Jacques et al. | 350/96.20 |
| 4,148,553 | 4/1979 | Asam | 350/96.21 |
| 4,205,898 | 6/1980 | Matthews et al. | 350/96.21 |
| 4,217,031 | 8/1980 | Mignien et al. | 350/96.21 |
| 4,353,619 | 10/1982 | Parr | 350/96.21 |
| 4,593,971 | 6/1986 | Clement et al. | 350/96.20 |
| 4,850,670 | 7/1989 | Mathis et al. | 350/96.21 |
| 4,856,866 | 8/1989 | Freeman et al. | 350/96.21 |

FOREIGN PATENT DOCUMENTS

| | | | |
|---|---|---|---|
| 3716792 | 12/1988 | Fed. Rep. of Germany | 350/96.21 X |
| 52-25648 | 2/1977 | Japan | 350/96.21 X |
| 52-77736 | 6/1977 | Japan | 350/96.21 X |
| 63-5311 | 1/1988 | Japan | 350/96.21 X |

OTHER PUBLICATIONS

Nagasawa et al., "Optical Fibre Connectors ... ", Elect. Lett., 4/81, vol. 17, No. 7, pp. 268–270.

Primary Examiner—William L. Sikes
Assistant Examiner—Brian M. Healy

[57] ABSTRACT

An optical cable coupling adapter comprises two end portions and a split sleeve. Each end portion holds a plurality of cylindrical rods with their outer circumferences kept in contact with one another. The cylindrical rods define one or more passages for an optical fiber. The split sleeve contacts and holds the exposed outer circumferential surfaces of the cylindrical rods and effects center alignment of the fiber passages in the two end portions.

6 Claims, 2 Drawing Sheets

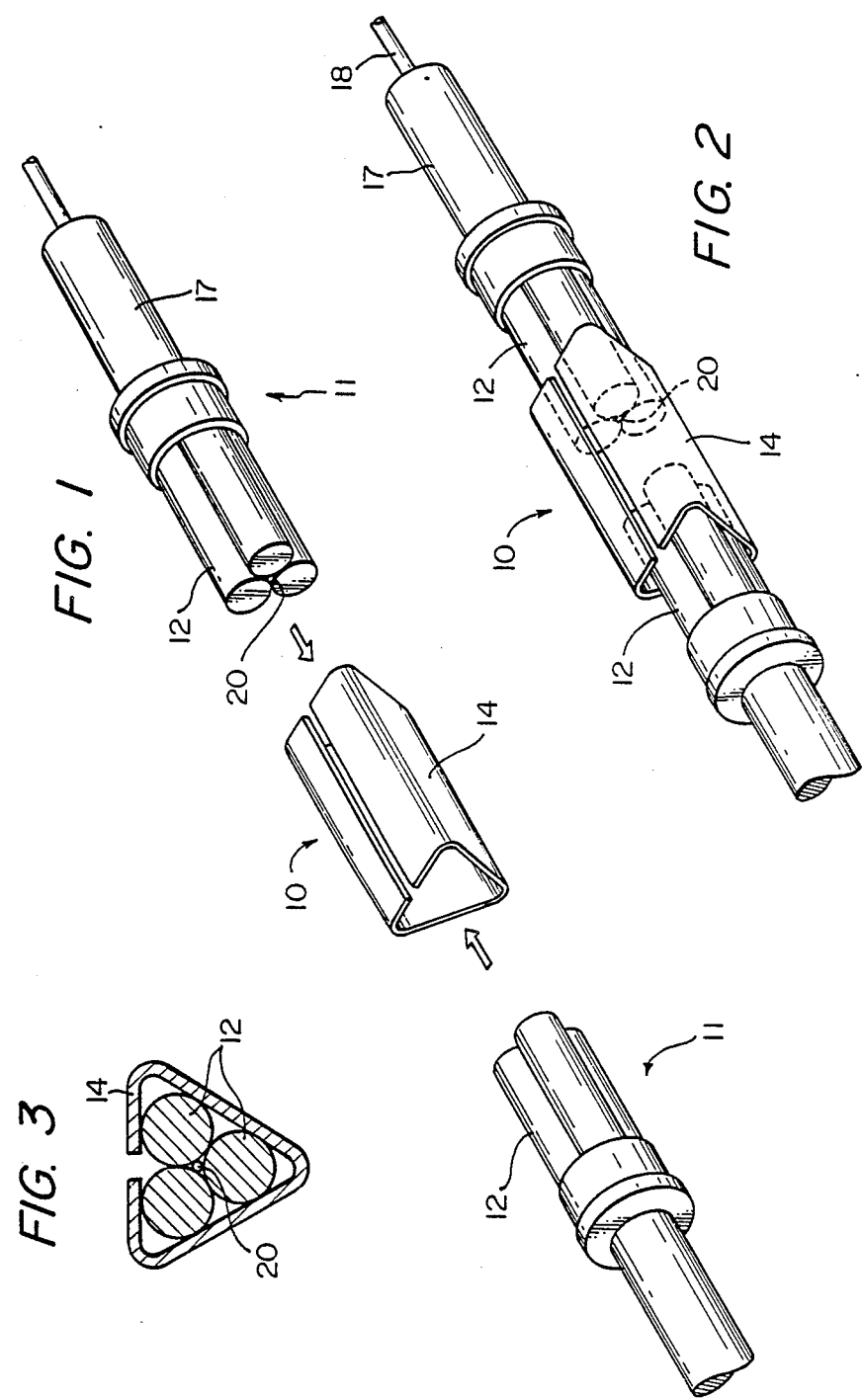

OPTICAL CABLE COUPLING ADAPTER

BACKGROUND OF THE INVENTION

1. Field of the Invention

This invention relates to a coupling adapter for an optical cable consisting of an optical fiber and a protective jacket, and more specifically, to a coupling adapter of the type permitting end-to-end coupling of optical fibers.

2. Description of the Prior Art

An optical cable coupling adapter of the type permitting end-to-end coupling of optical fibers has previously been known. Since the only significant feature of this type is that the ends of two fibers are in contact with each other, center alignment of the end portions of the optical fibers should be effected particularly accurately to minimize coupling losses.

An optical cable coupling adapter is known in which for effecting accurate center alignment, a small bore is provided on the central axis of cylindrical rods and the end portion of the optical fiber is disposed within the small bore. In this adapter, two cylindrical rods each having disposed therein the end portion of the optical fiber are held by a cylindrical split sleeve or the like so that their central axes are kept in alignment. This type of optical cable coupling adapter enables accurate alignment of the central axes of two optical fibers, but the need for providing small bores accurately on the central axes of the cylindrical rods makes it extremely difficult to build this type of coupling adapter.

Also known is an optical cable coupling adapter of the type in which three or four balls or cylindrical rods are disposed within a cylindrical ferrule and an optical cable is disposed in their center. Since, however, three or four balls or cylindrical rods are used in this type of optical cable coupling adapter, relative positions of the balls or rods cannot be determined according to only one factor. The result is that their relative positions in the cylindrical ferrule may be deviated, and moreover since the balls or rods are positioned with the outer circumference of the cylindrical ferrule being taken as a standard, accurate center alignment of optical cables cannot be effected.

SUMMARY OF THE INVENTION

According to this invention, the aforesaid problems of the prior art can be solved by providing an optical cable coupling adapter comprising two end portions each holding a plurality of cylindrical rods with their outer circumferences kept in contact with one another, the cylindrical rods in each end portion defining a passage of an optical fiber, and a split sleeve adapted to make contact with the exposed outer circumferential surfaces of the cylindrical rods and effect center alignment of the fiber passages in the two end portions.

BRIEF DESCRIPTION OF THE ACCOMPANYING DRAWINGS

FIG. 1 is a perspective view of an optical cable coupling adapter in accordance with a preferred embodiment of this invention which is taken before securing rods to a sleeve;

FIG. 2 is a perspective view of the optical cable coupling adapter of FIG. 1 which is taken during securing of the rods to the sleeve;

FIG. 3 is a sectional view of the essential parts of the optical cable coupling adapter of FIG. 2;

DETAILED DESCRIPTION OF PREFERRED EMBODIMENTS

Figure 5:
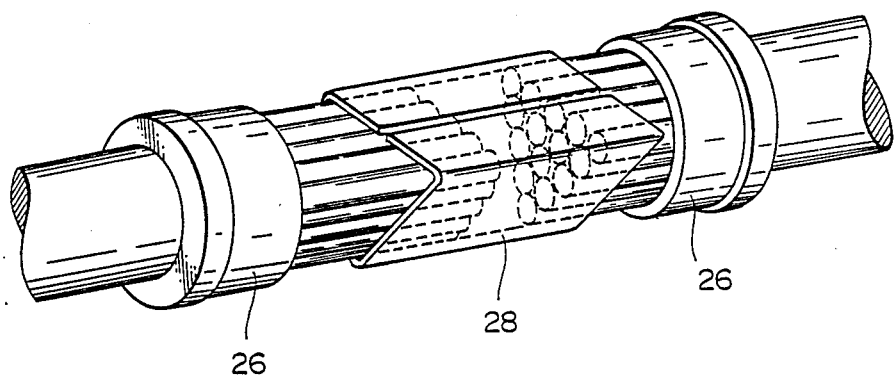
FIG. 5 is a perspective view of an optical cable coupling adapter in accordance with still another embodiment of the invention which is taken during securing of rods to a sleeve.

With reference to FIGS. 1 to 3, optical cable coupling adapter in accordance with the preferred embodiments of the invention will be described.

The optical cable coupling adapter 10 includes two end portions 11 and a nearly triangular metallic split sleeve 14. An optical fiber cable 18 and an optical fiber 20 are fixed to each of the two end portions 11, and the optical fiber 20 extends through a passage defined by three cylindrical rods 12.

The radius R of each of the three cylindrical rods 12 and the radius r of the optical fiber 20 contacting the outer circumferences of the three cylindrical rods 12 and disposed in the passage defined by these rods 12 satisfy the following equation.

$$R = (R + r) \cos 30°$$

Hence, r is given by the following equation.

$$r = (2/\sqrt{3} - 1) \cdot R$$

$$= 0.1547 \cdot R$$

If the radius r of the optical fiber is given, the use of three cylindrical rods 12 each having the radius R satisfying the above equation enables the optical fiber passages to be accurately aligned by the three cylindrical rods 12.

The cylindrical rods 12 may be formed of, for example, ceramics or metals such as stainless steel. It is relatively easy to form cylindrical rods of accurate shapes and sizes from metals. Accordingly, the optical fiber can be accurately positioned with respect to the three cylindrical rods 12. This permits center alignment of the two opposing optical fibers 20.

In the embodiment described above, the three cylindrical rods 12 have the same radius. It is also possible to use rods having different radii.

A metallic split sleeve 14 is disposed so as to surround the exposed portions of the three cylindrical rods 12 in both end portions 11 (FIG. 3). As shown in FIG. 3, the metallic split sleeve 14 is nearly triangular in cross section and extends in a straight line in the axial direction. Accordingly, the central axes of three pairs of cylindrical rods positioned opposite to each other are in alignment.

In connecting the two end portions 11, the metallic split sleeve 14 is slightly extended elastically, and as shown in FIGS. 1 and 2, three cylindrical rods 12 holding the optical fiber 20 are inserted into the sleeve 14 from both ends and positioned so that the end surfaces of the two optical fibers 20 face each other.

To create and maintain a high degree of axial alignment, the above metallic split sleeve extending in a straight line in the axial direction is used. If desired, locking means (not shown) may be provided to restrict the longitudinal movement of the end portions 11 and maintain the optical fibers 20 in end-to-end contact.

Figure 4:
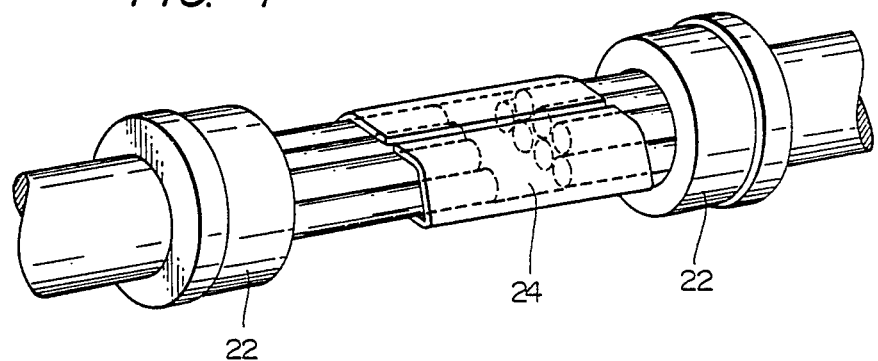
FIG. 4 is a perspective view of an optical cable coupling adapter in accordance with another embodiment of this invention which is taken during securing of rods to a sleeve.

The optical cable coupling adapter in accordance with this embodiment uses three cylindrical rods 12. Alternatively, it is possible to use end portions each having four cylindrical rods 12, arrange the cylindrical rods 12 so that their outer circumferential surfaces contact each other and they have a nearly rhombic cross sectional shape as a whole, and to hold two optical fibers by these end portions. Furthermore, as shown in FIG. 4, end portions 22 having seven cylindrical rods arranged in a nearly trapezoidal shape and a split sleeve 24 having a nearly trapezoidal cross section for center alignment may be used.

In another embodiment, it is possible to use end portions 26 having 6, 10, or 15 cylindrical rods arranged so that their outer circumferential surfaces contact each other and they have a nearly triangular cross sectional shape as a whole, passages being defined among them for a plurality of optical fibers, and a split sleeve 28 having a nearly triangular cross section for center alignment.

The optical cable coulping adapter in accordance with this invention permits relatively easy center alignment of optical fiber cables with high accuracy as a result of using cylindrical rods which can be relatively easily obtained in highly accurate shapes and sizes.

We claim:

1. An optical cable coupling adapter comprising two end portions each holding a plurality of cylindrical rods with their outer circumferences kept in contact with one another, the cylindrical rods in each end portion defining a passage for an optical fiber, and a single piece nearly polygonal split sleeve adapted to make contact with the exposed outer circumferential surfaces of the cylindrical rods and effect center alignment of the fiber passages in the two end portions.

2. The optical cable coupling adapter of claim 1 in which each end portion has three said cylindrical rods and one optical fiber passage defined by the rods.

3. The optical cable coupling adapter of claim 1 in which each portion has four said cylindrical rods and two optical fiber passages defined by the rods.

4. The optical cable coupling adapter of claim 1 in which each end portion has six said cylindrical rods arranged so as to have a nearly triangular section as a whole, and four optical fiber passages defined by the rods.

5. The optical cable coupling adapter of any one of claim 1 to 4 in which the radii of the cylindrical rods are substantially equal to each other.

6. The optical fiber coupling adapter of any one of claims 1 to 4 in which the radii of the cylindrical rods are different from each other.

* * * * *